May 27, 1969     D. H. FERMAN     3,445,952

TELESCOPIC FISHING ROD

Filed July 10, 1967

INVENTOR.
DAVID H. FERMAN
BY
*Isler & Ornstein*
ATTORNEYS

United States Patent Office 3,445,952
Patented May 27, 1969

3,445,952
TELESCOPIC FISHING ROD
David H. Ferman, 6623 Maplewood Drive,
Mayfield Heights, Cleveland, Ohio
Filed July 10, 1967, Ser. No. 652,309
Int. Cl. A01k 87/00; F16b 7/10
U.S. Cl. 43—18                                    1 Claim

ABSTRACT OF THE DISCLOSURE

A telescopic fishing rod comprising a handle, butt section and end section, wherein the handle and base of the butt section are provided with coacting means for preventing relative rotation therebetween. The other end of the butt section is provided with a flange having an opening of non-circular cross-section. The end section is telescopically received in the butt section, and has a cross-section corresponding to that of the opening for preventing rotation of the end section relatively to the butt section. The end section has a flange on its base to abut the butt section flange and prevent its removal. The end section flange is of polygonal cross-section, having only its corners touching the inner wall of the butt section.

---

This invention relates generally to fishing rods, but has reference more particularly to rods of the telescopic type.

It has heretofore been proposed, as in Patents Nos. 1,441,045 and 2,874,507 to provide telescopic fishing rods, in which means have been incorporated for limiting the extent to which the sections may be extended or pulled out relatively to each other.

Since the sections of the telescopic rod are usually provided on their exterior with aligned eyes or line guides, through which the fishing line extends, it is desirable that these eyes or line guides be maintained in alignment with each other, in any position of extension or retraction of the rod. For this purpose, it is essential that means be provided for preventing rotation or rotary movement of the sections relatively to each other, at all times during extension or retraction of the rod.

It is also essential that means be provided for preventing rotation or rotary movement of the butt section of the rod, i.e., that section of the rod adjacent the handle of the rod, relatively to the handle, at all times during extension or retraction of the butt section relatively to the handle.

The present invention, accordingly, has, as its primary object, the provision of a telescopic fishing rod of the character described, in which improved means are incorporated for preventing rotation or rotary movement of the sections of the rod relatively to each other during extension or retraction of the rod.

Another object of the invention is to provide improved means for preventing rotation or rotary movement of the butt section of the rod relatively to the handle during extension or retraction of the butt section.

A further object of the invention is to provide a telescopic fishing rod, of the character described, which can be made at relatively low cost.

Other objects and advantages of my invention will become apparent during the course of the following description.

In the accompanying drawings forming a part of this specification, and in which like numerals are employed to designate like parts throughout the same, FIG. 1 is a fragmentary elevational view of a rod embodying the invention;

Figure 1:
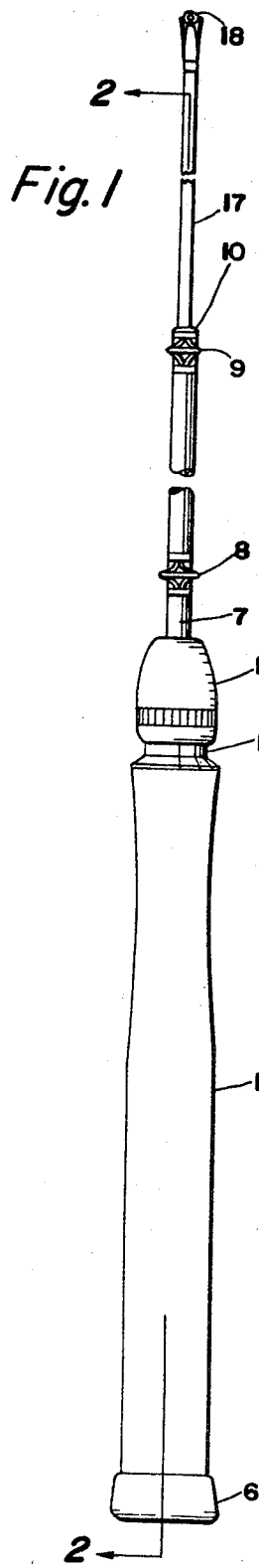
Figure 2:
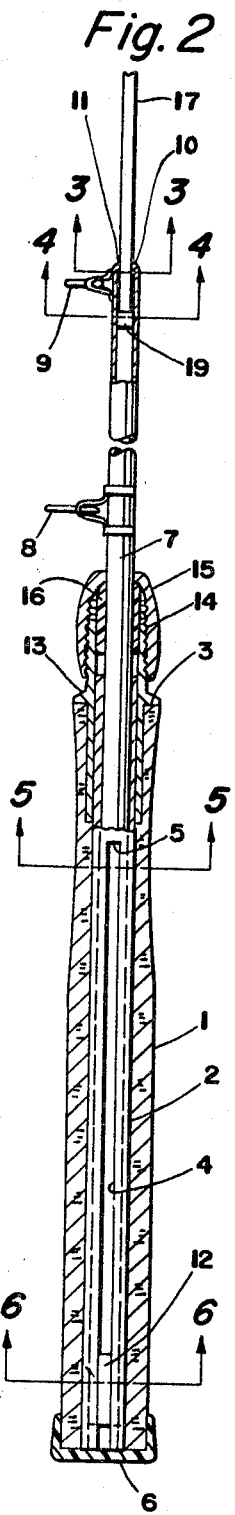
FIG. 2 is a view of the rod partly in elevation, and partly in cross-section, taken on the line 2—2 of FIG. 1.

Referring more particularly to the drawings, the fishing rod will be seen to comprise a handle 1 of light weight material, such, for example, as cork, and having rigidly secured therein a tubular metallic element 2, which extends from the base of the handle to a point just ahead of the forward end 3 of the handle.

The element 2 has a portion of its wall removed at one point in the periphery thereof to provide a slot 4 which extends longitudinally from the base of the element 2 to a point 5, and which serves a purpose to be presently described.

A cap 6 is provided for covering the base of the handle 1 and the element 2.

Figure 3:
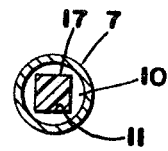
FIG. 3 is a transverse cross-sectional view, taken on the line 3—3 of FIG. 2.
Figure 4:
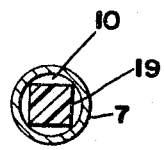
FIG. 4 is a transverse cross-sectional view, taken on the line 4—4 of FIG. 2.
Figure 5:
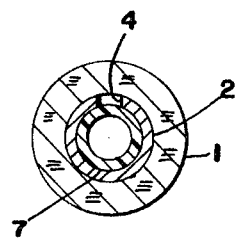
FIG. 5 is a transverse cross-sectional view, taken on the line 5—5 of FIG. 2.
Figure 6:
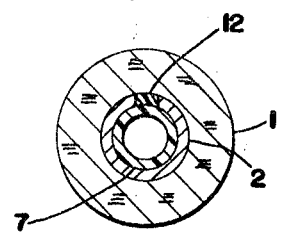
FIG. 6 is a transverse cross-sectional view, taken on the line 6—6 of FIG. 2.

The rod also includes a tubular butt section 7, which may be made of fiber glass or like material, and which is slidably mounted for telescopic movement in the tubular element 2, so that it may be extended or retracted, as desired. The butt section 7 is provided at axially-spaced points with eyes or line guides 8 and 9, and is provided at its forward end with an inturned flange 10, having a square opening 11 therein (see FIG. 3), which opening serves a purpose to be presently described.

For the purpose of preventing rotation of the butt section 7 relatively to the handle 1 during extension or retraction of the butt section, the butt section is provided at its lower end with a tenon or key 12 which is slidable in the slot 4 and engages the walls of this slot to prevent such rotation. The forward end 5 of the slot 4 acts as a stop with which the tenon 12 comes into abutment, when the butt section 7 is fully extended, to thereby prevent the butt section from being pulled away from the handle 1.

For the purpose of locking the butt section 7 against movement, a ferrule 13 is provided which is embedded in the handle 1 and has a threaded upper portion 14, to which a nut 15 is secured. Interposed between the portion 14 of the ferrule and the butt section 7 is a tubular slotted clutch element 16 of plastic or like material, through which the butt section may slide when the nut 15 is loosened. When the nut 15 is tightened, the clutch element 16 is moved into tight frictional contact with the butt section 7, thereby locking the butt section against movement.

The fishing rod further includes an end section 17, of square cross-section, and provided at its forward end with an eye or line guides 18, which is in alignment with the eyes or line guides 8 and 9, and through which the fishing line extends.

The end section 17 is preferably made of a material such as fiber glass, and its cross-sectional dimensions correspond to those of the opening 11 in the flange 10, so that the section 17, while slidable through the opening 11, cannot rotate relatively to the butt section 7 during extension or retraction of the section 17, thereby insuring that the eye or line guide 18 is always aligned with the eyes or line guides 8 and 9.

The end section 17 is provided at its lower end with a flange 19 of square cross-section, and of slightly larger external cross-section than the section 17. The corners of this flange engage the inner wall of the butt section 7, so as to prevent angular movement of the section 17 relatively to the section 7 during extension or retraction of the section 17. When the section 17 is fully extended, the flange 19 comes into abutment with the flange 10, thereby preventing the section 17 from being pulled out of the section 7.

Although the section 17 has been described as one having four sides, it will be understood that it may be of triangular cross-section, i.e., having three sides, or of polygonal cross-section other than square, i.e., having five, six, seven or eight sides. In such case, the opening 11 will be of a shape or contour corresponding to the cross-section of the section 17.

Having thus described my invention, I claim:

1. In a fishing rod, a tubular butt section having a flange at its forward end, said flange having a non-circular opening therein, and an end section telescopically mounted in said butt section and of a cross-section corresponding to that of said opening, whereby said end section is prevented from rotating relative to said butt section during said telescopic movement, said end section provided at its base with a flange adapted to come into abutment with said first-named flange to prevent removal of said end section from said butt section, said end section flange being of polygonal cross-section, having only its corners engaging the inner wall of said butt section.

References Cited

UNITED STATES PATENTS

| | | | |
|---|---|---|---|
| 912,552 | 2/1909 | Fischer | 43—18 |
| 918,579 | 4/1909 | Murch | 43—18 X |
| 2,276,524 | 3/1942 | Taylor | 43—18 |
| 2,382,291 | 8/1945 | Carlberg | 287—58 |
| 2,595,597 | 5/1952 | Morseth | 287—58 X |
| 2,874,507 | 2/1959 | Faber et al. | 43—18 |
| 3,098,669 | 7/1963 | Fortin et al. | 287—58 |

SAMUEL KOREN, *Primary Examiner.*

J. H. CZERWONKY, *Assistant Examiner.*

U.S. Cl. X.R.

43—23; 287—58